(12) United States Patent
Hong (10) Patent No.: US 8,781,109 B2
(45) Date of Patent: Jul. 15, 2014

(54) ELECTRONIC DEVICE CASE WITH CHANGEABLE PANEL

(71) Applicant: Uncommon LLC, Chicago, IL (US)

(72) Inventor: John Hong, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 0 days.

(21) Appl. No.: 13/660,147

(22) Filed: Oct. 25, 2012

(65) Prior Publication Data

US 2013/0257240 A1    Oct. 3, 2013

Related U.S. Application Data

(63) Continuation-in-part of application No. 29/431,945, filed on Sep. 12, 2012, and a continuation-in-part of application No. 29/417,069, filed on Mar. 29, 2012.

(51) Int. Cl.
| | | |
|---|---|---|
| *H04M 1/00* | (2006.01) | |
| *H04M 1/02* | (2006.01) | |
| *H04M 1/04* | (2006.01) | |
| *H04B 1/38* | (2006.01) | |

(52) U.S. Cl.
CPC .............. *H04M 1/0283* (2013.01); *H04M 1/04* (2013.01); *H04B 1/3888* (2013.01)
USPC .......................................... 379/451; 379/441

(58) Field of Classification Search
USPC .................. 379/441, 446, 449, 451, 454, 455; 455/575.1, 575.8; 361/679.01, 679.3, 361/679.41, 679.56, 679.57; 206/305, 321, 206/701; D14/203.1, 203.3–203.7, D14/250–253
See application file for complete search history.

(56) References Cited

U.S. PATENT DOCUMENTS

D647,519 S  *  10/2011  Rothbaum et al. ........... D14/250

* cited by examiner

*Primary Examiner* — Tuan D Nguyen
(74) *Attorney, Agent, or Firm* — Bishop Diehl & Lee, Ltd.

(57) ABSTRACT

An electronic device case or system having a protective housing capable of aesthetic change. A plurality of back panels having different images thereon can be interchanged in a sidewall portion to alter the look of the case. The panel images may be colors, pictures, designs, logos, or even text.

10 Claims, 13 Drawing Sheets

ELECTRONIC DEVICE CASE WITH CHANGEABLE PANEL

RELATED APPLICATIONS

This application is a continuation-in-part of U.S. patent Design application Ser. No. 29/431,945, filed on Sep. 12, 2012, which is a continuation-in-part of U.S. patent Design application Ser. No. 29/417,069, filed on Mar. 29, 2012.

TECHNICAL FIELD OF THE INVENTION

The present inventions relate to peripheral components for electronic devices such as, for example, a smart phone, a gaming device, a tablet or the like.

BACKGROUND OF THE INVENTION

Mobile phone cases have very quickly blossomed into a multi-billion dollar industry. With each new entry into the field, phone cases become lighter, stronger, more colorful, and even more securable. Many phone case designers and manufacturers have focused on the primary purpose of a phone case—i.e., to protect the phone within—sacrificing aesthetics in some instances. In fact, the protective phone case has become such a necessary component of the phone itself, case manufacturers are often given new phone details well-ahead of the general public so that such cases are available as soon as a new phone reaches store shelves.

However, other than some minor aesthetic differences, phone case providers have been unable to point to any meaningful improvements or advantages they provide over cases made by other manufacturers. As a result, purchases of phone cases are typically made based on aesthetic appeal alone. Further, because the aesthetic quality is such an important factor, it is not uncommon for some users to have more than one phone case for much the same reason that they might have more than one pair of shoes.

But purchasing two, three or even more protective cases for any portable electronic device is cost prohibitive for many. Also, even where cost may not be an issue, the bulkiness of having several unused device cases can be a problem. As fads and fashion change, or as people change, the desire for another different protective case may be created. The solution to these problems has been missed by prior case designers and manufacturers.

Until the invention of the present application, many case manufacturers have stayed with adding new designs and new features by creating an entirely new case. The present invention solves these and other problems which went either unnoticed, ignored or unsolved by those skilled in the art. The present invention provides a case design which is capable of being changed repeatedly by a user without sacrificing portability, functionality or affordability.

SUMMARY OF THE INVENTION

There is disclosed herein an improved protective case and decorative protective case system for an electronic device which avoids the disadvantages of prior devices while affording additional aesthetic and operating advantages.

Generally speaking, the protective case for an electronic device comprises a continuous sidewall for surrounding the periphery of an electronic device and a removable back panel. A plurality of openings may be defined in the sidewall for permitting access to ports or control buttons on the electronic device. The sidewall also includes a front edge and a back edge.

In an embodiment, the removable primary back panel is configured to fit within an open area defined by the continuous sidewall and a retaining flange extends from the back edge of the continuous sidewall to retain the back panel within the open area.

A plurality of the back panels may be used to periodically alter the aesthetic look of the protective case by changing panels based on an image on each. The image on each panel may be different colors, photos, designs, logos, and even text, such as a favorite poem or quote.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-15, there are illustrated embodiments of a protective case, generally designated by the numerals 10 and 110. The particular illustrated cases 10 (FIGS. 1-7 and 15) and 110 (FIGS. 8-14) are for an Apple® iPhone 4/4S and an iPhone 5, respectively. In fact, while all the embodiments illustrated are directed to iPhones, it should be understood that the principles of the invention can be more broadly applied to most any smart phone, as well as other types of portable electronic devices such as gaming consoles (e.g., Gameboy), tablets (e.g., iPad) and the like, as long as a protective case is useful.

As can be seen in FIGS. 1-7, the case 10 is comprised of a continuous outer sidewall 12 and a back panel 14. The sidewall 12 is designed to fit about the periphery of an electronic device (not shown) in a protective manner and holding in place the back panel 14, which also protects the secured device. Numerous openings 16 may be defined within the sidewall 12 to align with any ports, speakers, microphones, switches or buttons on the device used to operate or interact with the electronic device. Alternatively, integral button areas 122 (See FIG. 8) may be provided in the sidewall 12 which interact with a corresponding component on the device (e.g., a volume toggle button). The sidewall 12 defines an open area 20 into which the electronic device will be positioned.

The sidewall 12 has both a front edge 24 and a back edge 26. In an alternate embodiments, the sidewall 12 is comprised of two parts. These may be a front and back portion or a top and bottom portion. The two parts would preferably snap or friction fit together to form the entirety of the sidewall 12.

A front portion 30 including the front edge 24 and a back portion 32 including the back edge 26 would allow the electronic device to be sandwiched between the two portions when assembled. A retaining flange 34 preferably extends from each of the front and back edges, 24 and 26, to provide securing both the device and the back panel 14 within the open area 20 of the sidewall 12.

FIGS. 8-14 illustrate a case 110 very similar to the case 10 of FIGS. 1-7. The case 110 is comprised of a continuous outer sidewall 112 and a back panel 114. The sidewall 112 is designed to fit about the periphery of an electronic device (not shown) in a protective manner and holding in place the back panel 114, which also protects the secured device. Numerous openings 116 may be defined within the sidewall 112 to align with any ports, speakers, microphones, switches or buttons on the device used to operate or interact with the electronic device. An integral button area 122 is provided in the sidewall 112 which interact with a corresponding component on the device (e.g., a volume toggle button). The sidewall 112 defines an open area 120 into which the electronic device will be positioned.

The sidewall 112 has both a front edge 124 and a back edge 126. In an alternate embodiments, the sidewall 112 is comprised of two parts. These may be a front and back portion or a top and bottom portion. The two parts would preferably snap or friction fit together to form the entirety of the sidewall 112.

Figure 1:
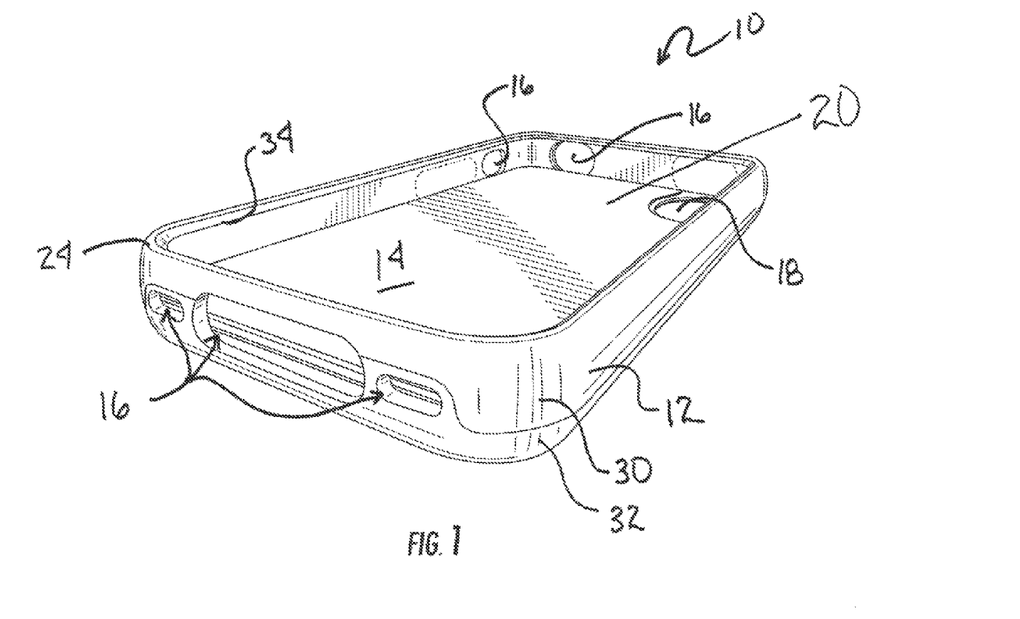
FIG. 1 is a perspective view of an embodiment of a case made in accordance with the present invention.
Figure 2:
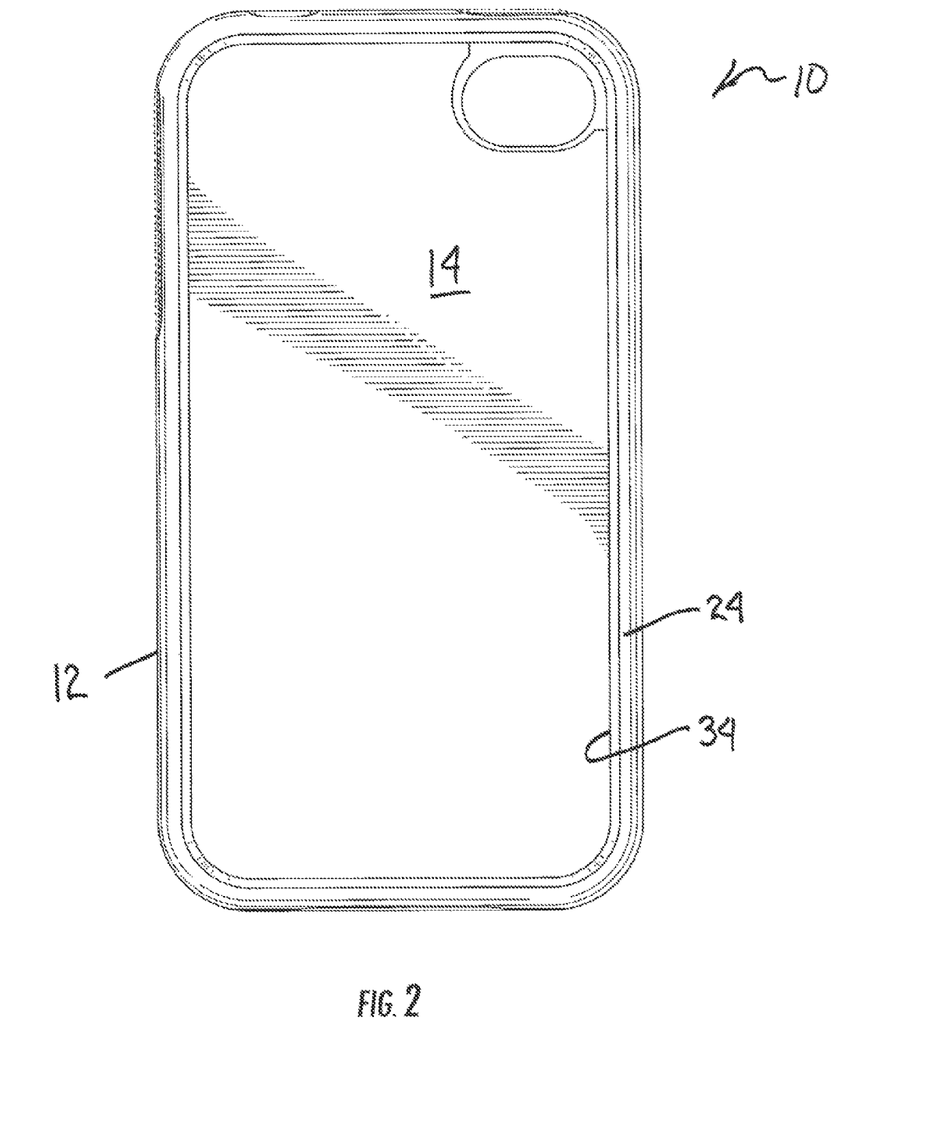
FIG. 2 is a front (inside) view of the embodiment of FIG. 1.
Figure 3:
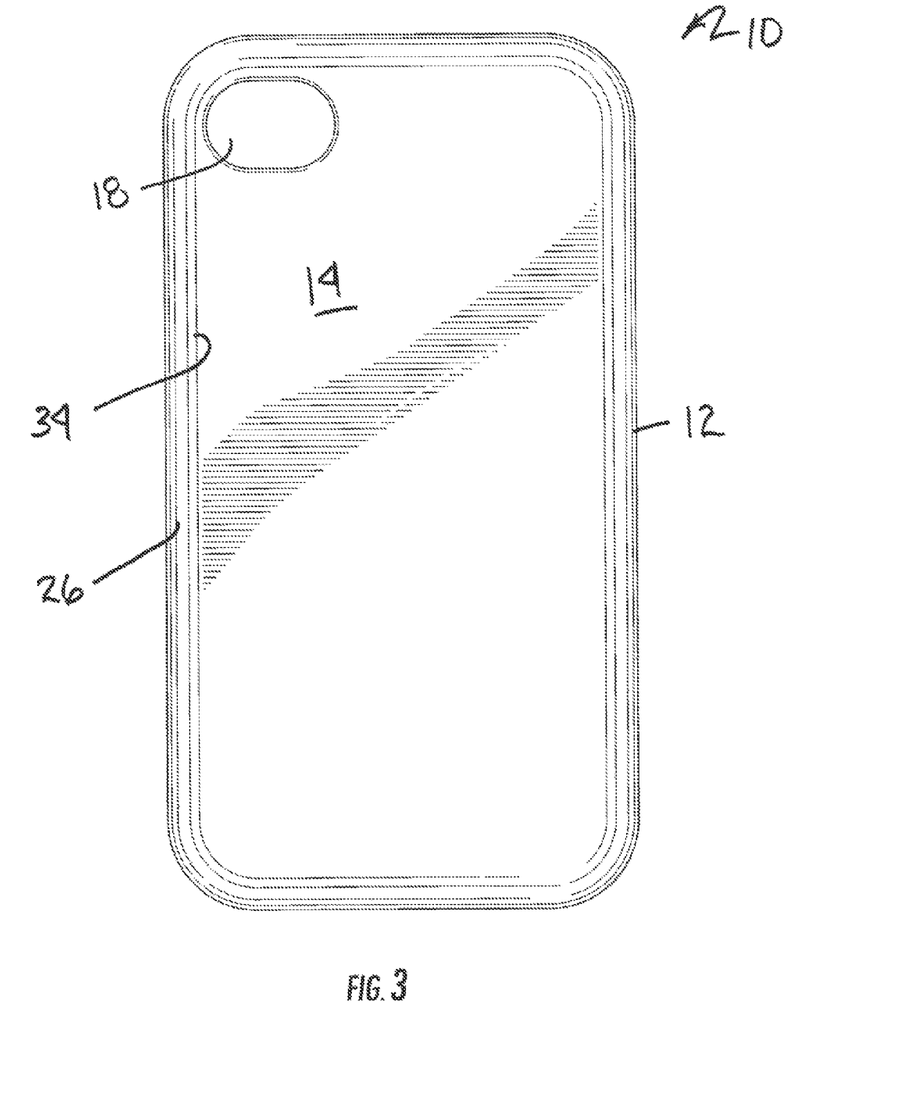
FIG. 3 is a back view of the embodiment of FIG. 1.
Figure 4:
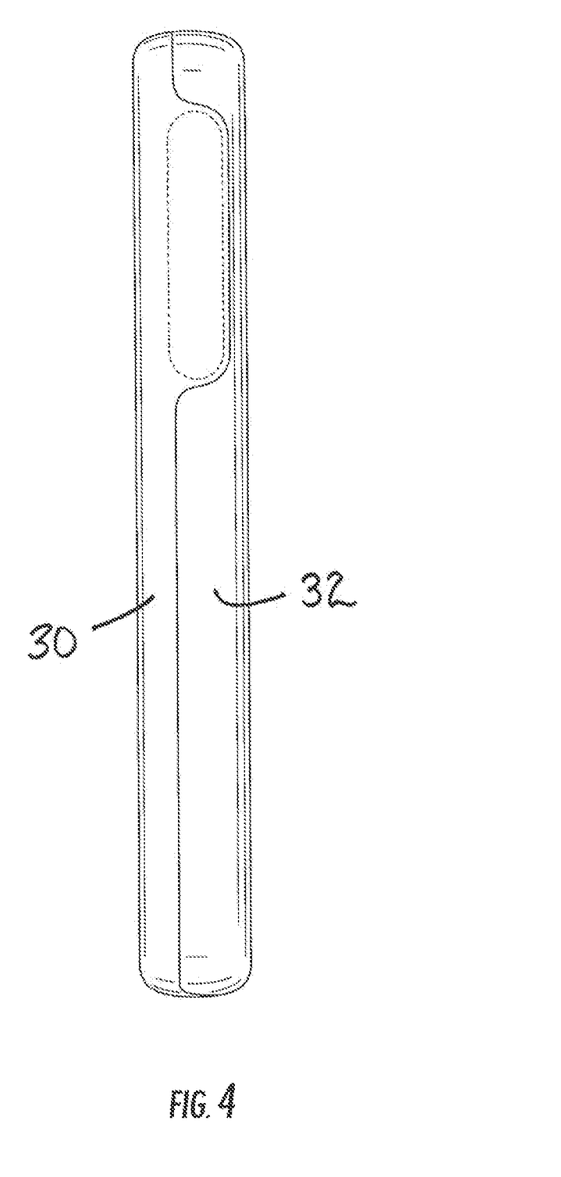
FIG. 4 is a side view of the embodiment of FIG. 1.
Figure 5:
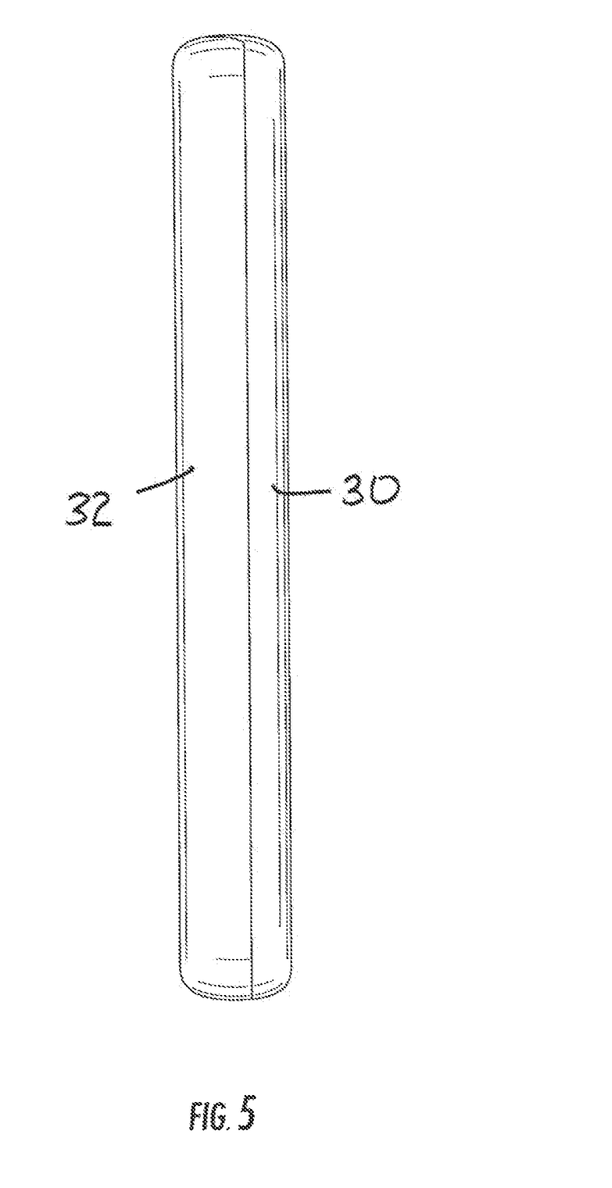
FIG. 5 is another side view of the embodiment of FIG. 1.
Figure 6:
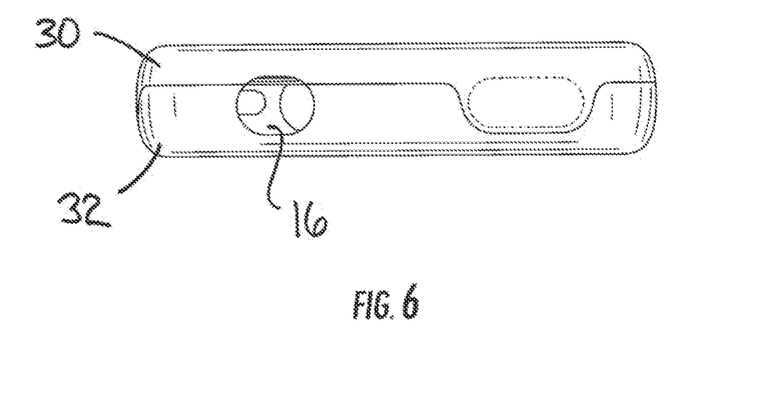
FIG. 6 is a top view of the embodiment of FIG. 1.
Figure 7:
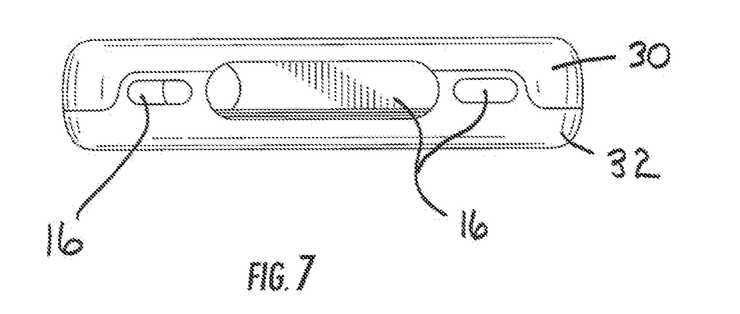
FIG. 7 is a bottom view of the embodiment of FIG. 1.
Figure 8:
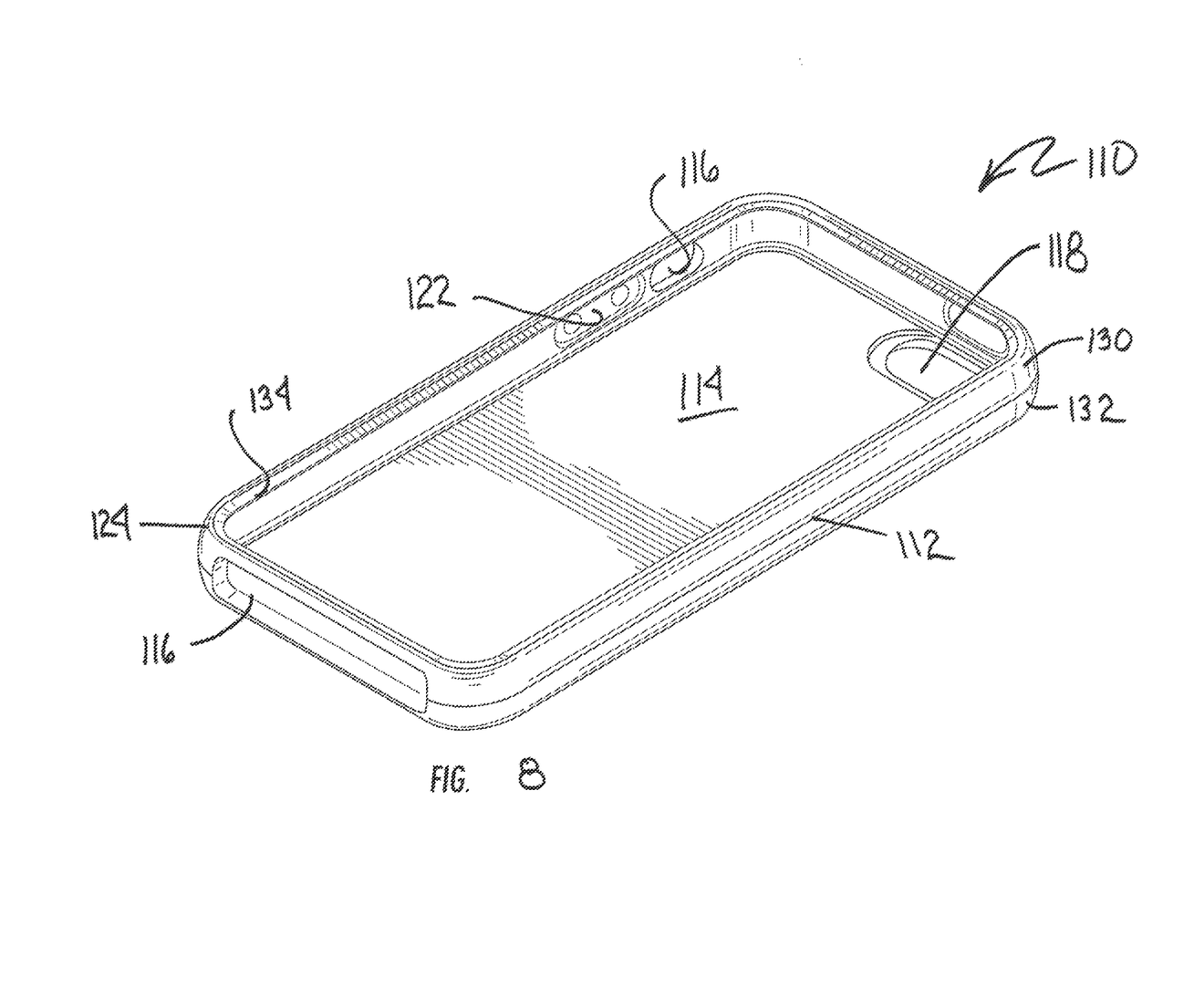
FIG. 8 is a perspective view of another embodiment of a case made in accordance with the present invention.
Figure 9:
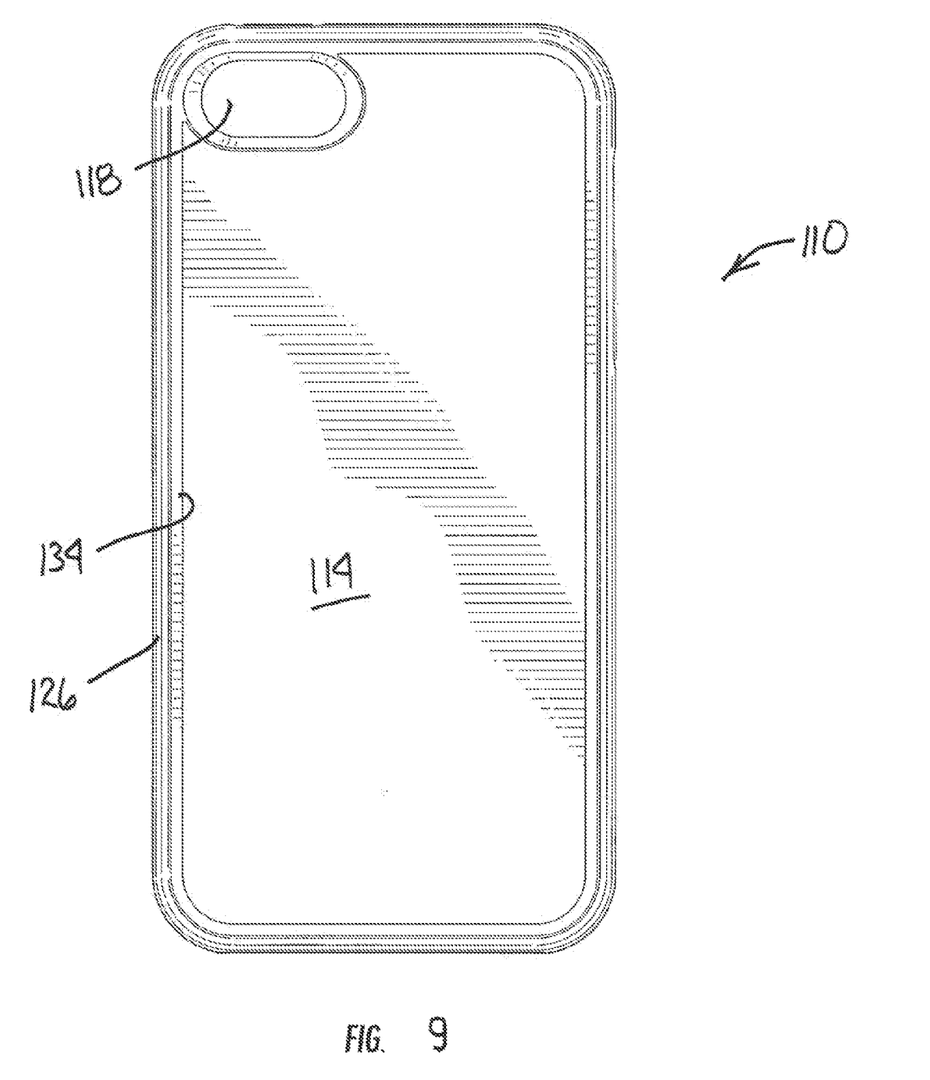
FIG. 9 is a back view of the embodiment of FIG. 8.
Figure 10:
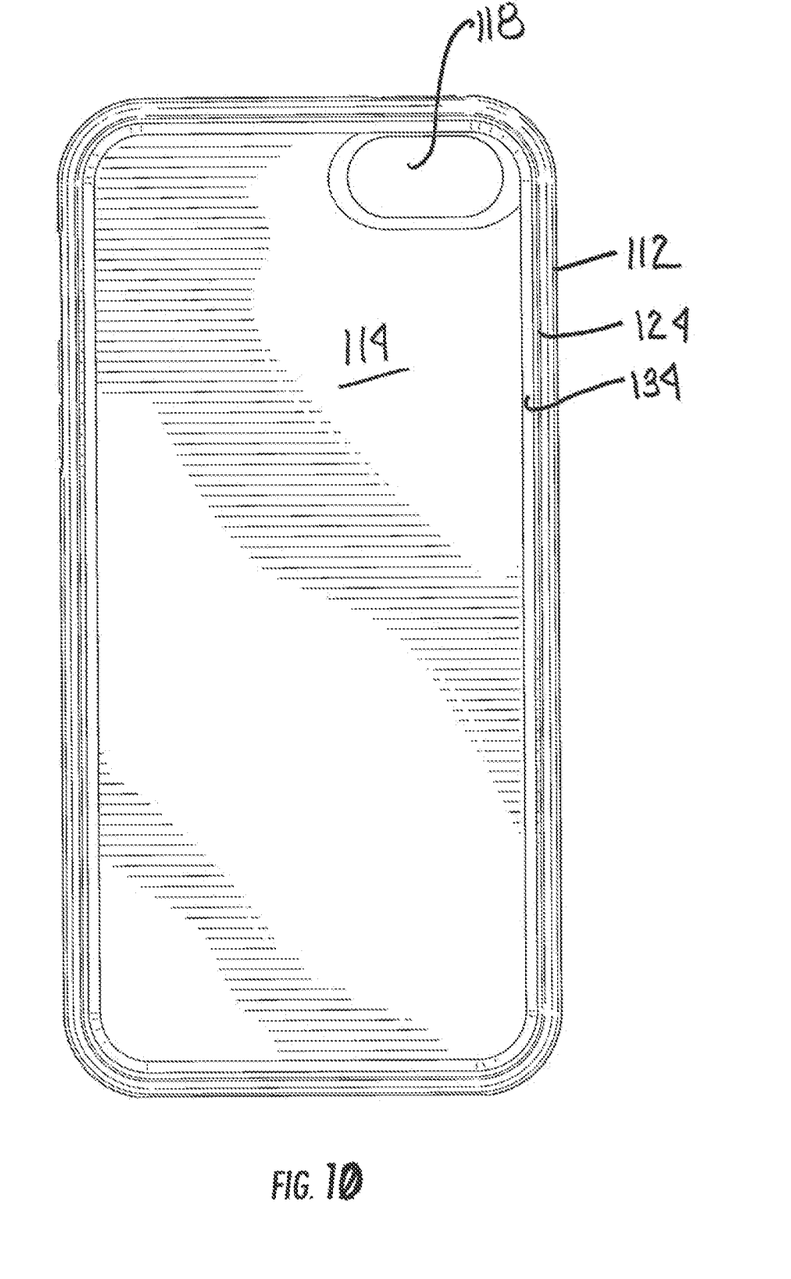
FIG. 10 is a front (inside) view of the embodiment of FIG. 8.
Figure 11:
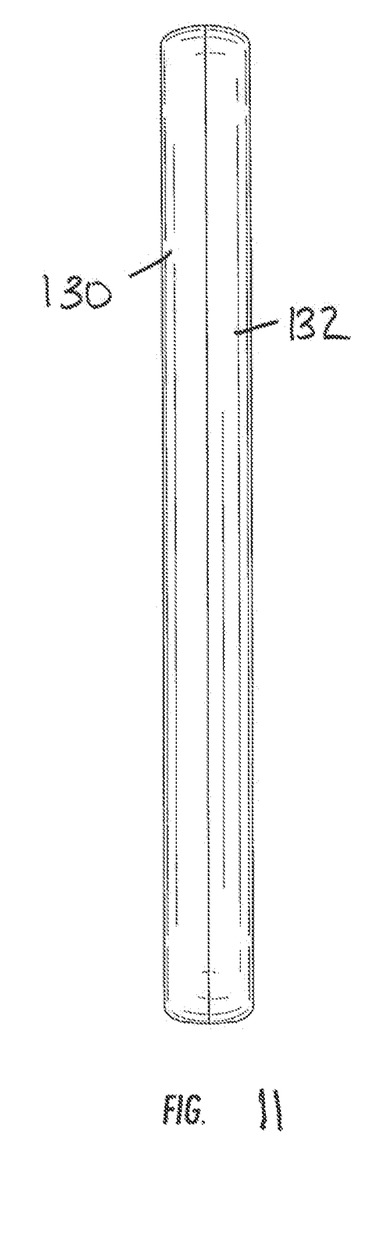
FIGS. 11 and 12 are side views of the embodiment of FIG. 8.
Figure 12:
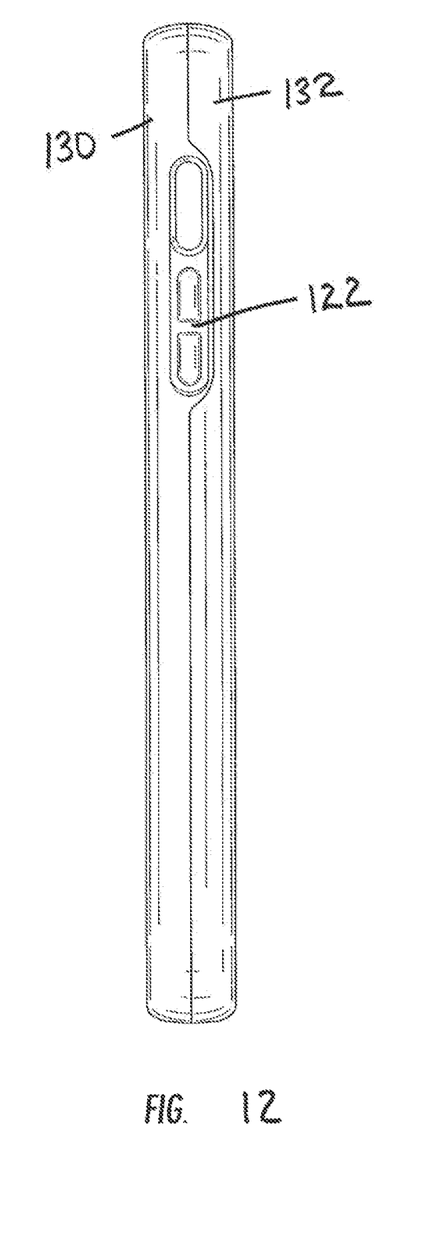
Figure 13:
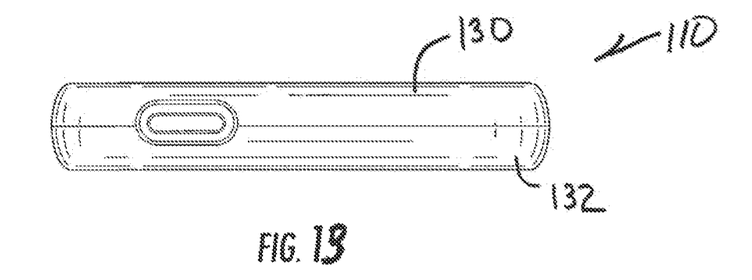
FIG. 13 is a top view of the embodiment of FIG. 8.
Figure 14:
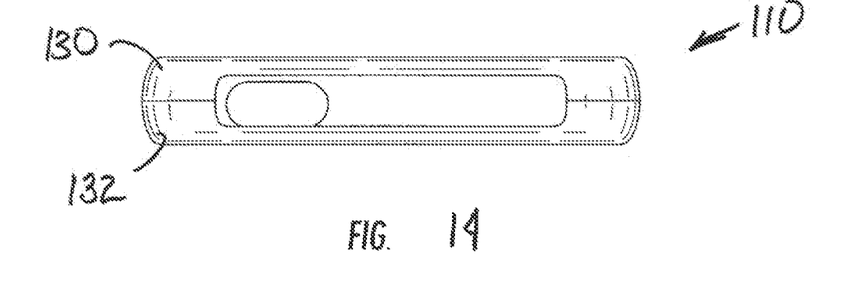
FIG. 14 is a bottom view of the embodiment of FIG. 8.
Figure 15:
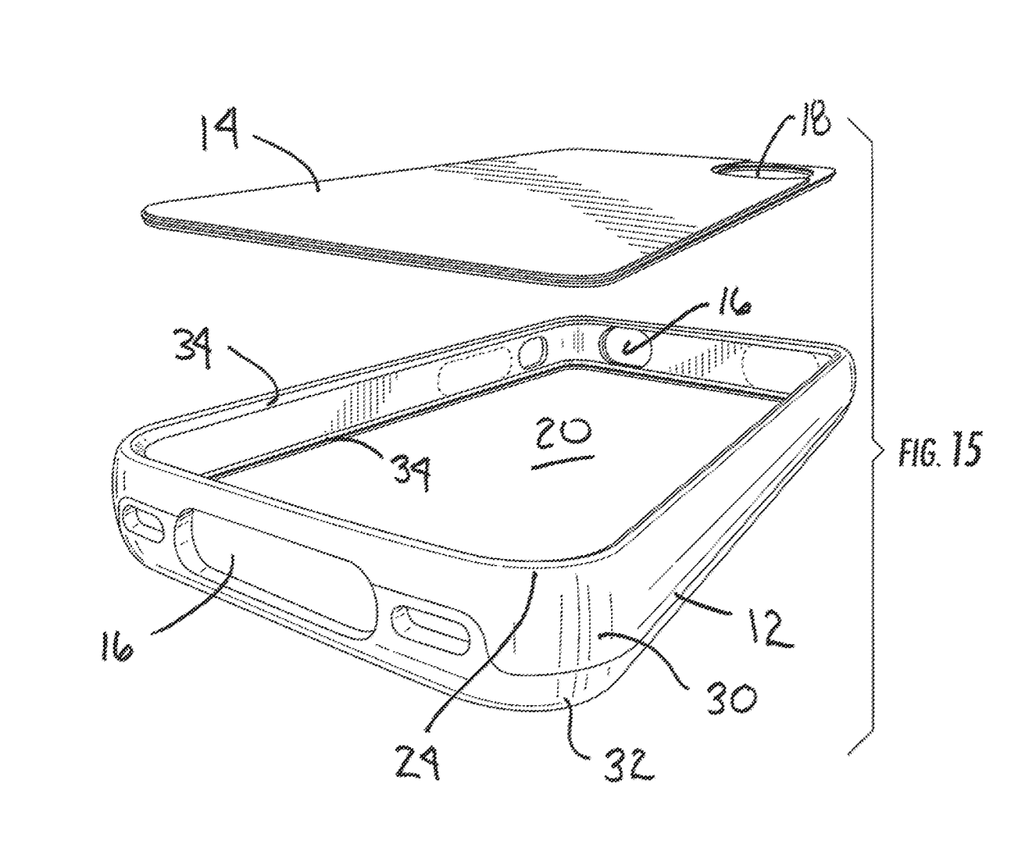
FIG. 15 is an exploded view of the embodiment of FIG. 1.

The back panel 14 (or 114) is basically a flat, rectangular shaped panel which may include various degrees of cushioning and/or rigid material (preferably layered) to protect an enclosed device. Openings 118, such as for a phone camera, may be provided within the back panel 14/114. Further, each panel 14/114 may include an aesthetic image, such as color (s), picture, design, logo, or even text. The image may be customizable for the particular user, if desired. To change the look of the case 10/110, the user need only remove the electronic device, change-out the existing panel with a newer panel and replace the device. FIG. 15 illustrates the removed panel 14.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A protective case for a portable electronic device, the case comprising:
    a continuous sidewall for surrounding a periphery of a portable electronic device and having a plurality of openings defined therein for permitting access to ports or control buttons on the electronic device, the sidewall having a front edge and a back edge;
    a removable primary back panel configured to fit within an open area defined by the continuous sidewall and abut a portable electronic device positioned within the continuous sidewall; and
    a retaining flange extending from the back edge of the continuous sidewall to engage an outer surface of the removable back panel and retain the back panel within the open area.

2. The protective case of claim 1, wherein the continuous sidewall comprises an upper portion including the front edge and a lower portion including the back edge, and wherein the upper and lower portions connect together around a portable electronic device.

3. The protective case of claim 2, further comprising a retaining flange extending from the front edge of the continuous sidewall.

4. The protective case of claim 1, wherein the removable primary back panel comprises an aesthetic image thereon.

5. The protective case of claim 4, wherein the removable primary back panel is replaceable with an alternate back panel having a different aesthetic image thereon.

6. The protective case of claim 1, further comprising at least one alternate back panel for interchanging with the primary back panel.

7. The protective case of claim 1, wherein the primary back panel includes an opening for a camera lens.

8. The protective case of claim 1, wherein the primary back panel snap fits into the continuous sidewall.

9. The protective case of claim 1, further comprising a retaining flange extending from the front edge of the continuous sidewall.

10. A protective case system for a portable electronic device, the protective case system comprising:
    a continuous sidewall for surrounding a periphery of an electronic device and having a plurality of openings defined therein for permitting access to ports or control buttons on the electronic device, the sidewall having a front edge and a back edge;
    a plurality of interchangeable back panels, each one having a different image or color thereon and separately configured to fit within an open area defined by the continuous sidewall and abut a portable electronic device positioned within the continuous sidewall; and
    a retaining flange extending from the back edge of the continuous sidewall to separately engage an outer surface of each of the plurality of interchangeable back panels and retain the back panel within the open area;
    wherein one of the plurality of interchangeable back panels is placed within the open area during use, while remaining interchangeable back panels are stored for later use.

* * * * *